(12) United States Patent
Yang

(10) Patent No.: US 8,204,652 B2
(45) Date of Patent: Jun. 19, 2012

(54) METHOD FOR COMPENSATING STEERING OF MOTOR DRIVE POWER STEERING SYSTEM

(75) Inventor: Seung Hoon Yang, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 744 days.

(21) Appl. No.: 12/345,759

(22) Filed: Dec. 30, 2008

(65) Prior Publication Data

US 2010/0125391 A1   May 20, 2010

(30) Foreign Application Priority Data

Nov. 19, 2008 (KR) .................. 10-2008-0115415

(51) Int. Cl.
*G06F 17/00* (2006.01)
*B62D 5/04* (2006.01)

(52) U.S. Cl. ............... 701/41; 701/71; 180/443

(58) Field of Classification Search ........... 701/36, 701/41, 70–75, 78, 79, 82, 83, 84; 180/446, 180/443, 400, 6.2, 6.3, 6.6; 105/4.4; 114/144, 114/145; 116/31; 187/231; 188/350; 244/17.17, 244/50, 51; 280/426; 340/465; 342/71; 440/53

See application file for complete search history.

(56) References Cited

U.S. PATENT DOCUMENTS

| | | | |
|---|---|---|---|
| 2002/0022912 A1 | 2/2002 | Urabe et al. | |
| 2004/0031342 A1 | 2/2004 | Kim | |
| 2005/0051989 A1 | 3/2005 | Jung | |
| 2005/0119811 A1 | 6/2005 | Lim | |
| 2006/0217860 A1 | 9/2006 | Ihara | |
| 2008/0086248 A1 | 4/2008 | Lu et al. | |
| 2010/0324783 A1* | 12/2010 | Nishimura et al. | 701/41 |
| 2011/0010050 A1* | 1/2011 | Suzuki et al. | 701/41 |
| 2011/0031050 A1* | 2/2011 | Bradley et al. | 180/65.22 |
| 2011/0036660 A1* | 2/2011 | Kojo et al. | 180/446 |

* cited by examiner

*Primary Examiner* — Ronnie Mancho
(74) *Attorney, Agent, or Firm* — Greenblum & Bernstein, P.L.C.

(57) ABSTRACT

Disclosed herein is a method for compensating steering of a motor drive power steering (MDPS) system. In this method, the MDPS system determines a slip of a vehicle, calculates a steering compensation value and controls a gain based on moment input from an electronic stability program (ESP) system under coordinate control between the MDPS system and the ESP system, so that stability of the vehicle can be enhanced by reducing heterogeneous steering and preventing over steering.

8 Claims, 5 Drawing Sheets

Self Alignment Torque & Steering Angle

METHOD FOR COMPENSATING STEERING OF MOTOR DRIVE POWER STEERING SYSTEM

BACKGROUND OF THE INVENTION

1. Field of the Invention

The present invention relates to a method for compensating steering of a motor drive power steering system. More particularly, the present invention relates to a method for compensating steering of a motor drive power steering system, in which the motor drive power steering system determines a slip of a vehicle, calculates a steering compensation value, and controls a gain based on moment input from an electronic stability program system under coordinate control between the motor drive power steering system and the electronic stability program system, so that stability of the vehicle can be enhanced by reducing heterogeneous steering and preventing oversteer.

2. Description of the Related Art

In general, there are many cases where a power steering pump is used to allow a steering wheel to be easily turned in a vehicle steering system, and most power steering pumps employ a system for making easy left and right turns based on an oil flow obtained when an engine is driven to rotate.

For this purpose, a motor drive power steering (MDPS) system has recently been applied to some kinds of vehicles.

The MDPS system does not utilize the oil flow due to rotation of the engine, but utilizes a system that employs rotation of a motor to make a steering wheel easy to turn. The MDPS system has a prominent effect on improving fuel economy since it reduces engine load.

In the MDPS system, an MDPS unit is provided in the steering system to control the motor and output a steering-angle signal.

Further, an electronic stability program (ESP) system has recently been applied to some kinds of vehicles. The ESP system selectively applies a brake on front, rear, left and right wheels to prevent the vehicle from slipping due to an extremely unstable state when accelerating, braking or cornering, thereby not only stabilizing behavior of the vehicle but also correcting a driver's mistake. The ESP system includes an ESP unit.

As such, if the MDPS system and the ESP system are provided to the vehicle, a controller area network (CAN) communication is basically employed for data communication between these systems.

The above descriptions are related not to the prior art, but just a background of the invention.

In the case of coordinate control through the CAN communication between the MDPS system and the ESP system, the ESP system controls the MDPS system to have torque such that a driver feels heavy steering at oversteer or understeer, thereby inducing driver counter steer.

However, if the ESP system just applies certain torque to the MDPS system, there arises a problem in that the driver feels heterogeneous steering.

That is, the ESP system supplies overlay torque to the MDPS system by generating the counter-steering upon the excessive slip of the vehicle, so that the overlay torque is turned into the heterogeneous steering.

Further, the ESP system gives the MDPS system an overlay torque command without determining a detailed operation of the MDPS system, so that there is a limit to solve the heterogeneous steering.

SUMMARY OF THE INVENTION

The present invention is conceived to solve the problems of the conventional techniques as described above, and an aspect of the present invention is to a method for compensating steering of an MDPS system, in which the MDPS system determines a slip of a vehicle, calculates a steering compensation value, and controls a gain based on moment input from an electronic stability program (ESP) system under coordinate control between the MDPS system and the ESP system, so that stability of the vehicle can be enhanced by reducing heterogeneous steering and preventing oversteer.

According to an aspect of the present invention, a method for compensating steering of an MDPS system is provided. The method includes: calculating primary torque through the MDPS system; calculating self-alignment torque generated when steering a vehicle; determining a steering compensation value based on the self-alignment torque and a steering angle; calculating secondary torque by applying the steering compensation value according to a vehicle speed to the primary torque; and controlling an application gain of the secondary torque in accordance with moment input from an electronic stability program (ESP) system to obtain final torque.

The self-alignment torque may be calculated by adding driver's steering torque, assistant torque of the MDPS system, and friction of a vehicle steering system The assistant torque of the MDPS system may be calculated from an electric current flowing in a drive motor of the MDPS system.

The steering compensation value may be in proportion to the steering angle but in inverse proportion to the self-alignment torque, and may be determined according to a mapping diagram which decreases logarithmically depending on the self-alignment torque.

The steering compensation value according to the vehicle speed may be varied according to whether the vehicle is being parked or driven.

When the vehicle is driven, the vehicle speed may be greater than or equal to 60 km/h.

The moment input from the ESP system may include a z-axis moment.

The application gain to obtain the final torque may be calculated by a ratio of the moment to a tuning parameter.

BRIEF DESCRIPTION OF THE DRAWINGS

The above and other aspects, features and advantages of the present invention will become apparent from the following description of a preferred embodiment given in conjunction with the accompanying drawings, in which.

DETAILED DESCRIPTION OF THE EMBODIMENT

Embodiments of the present invention will now be described in detail with reference to the accompanying drawings. It should be noted that the drawings are not to precise scale and may be exaggerated in thickness of lines or size of components for descriptive convenience and clarity only. Furthermore, terms used herein are defined by taking functions of the present invention into account and can be changed according to the custom or intention of users or operators. Therefore, definition of the terms should be made according to overall disclosures set forth herein.

Figure 1:
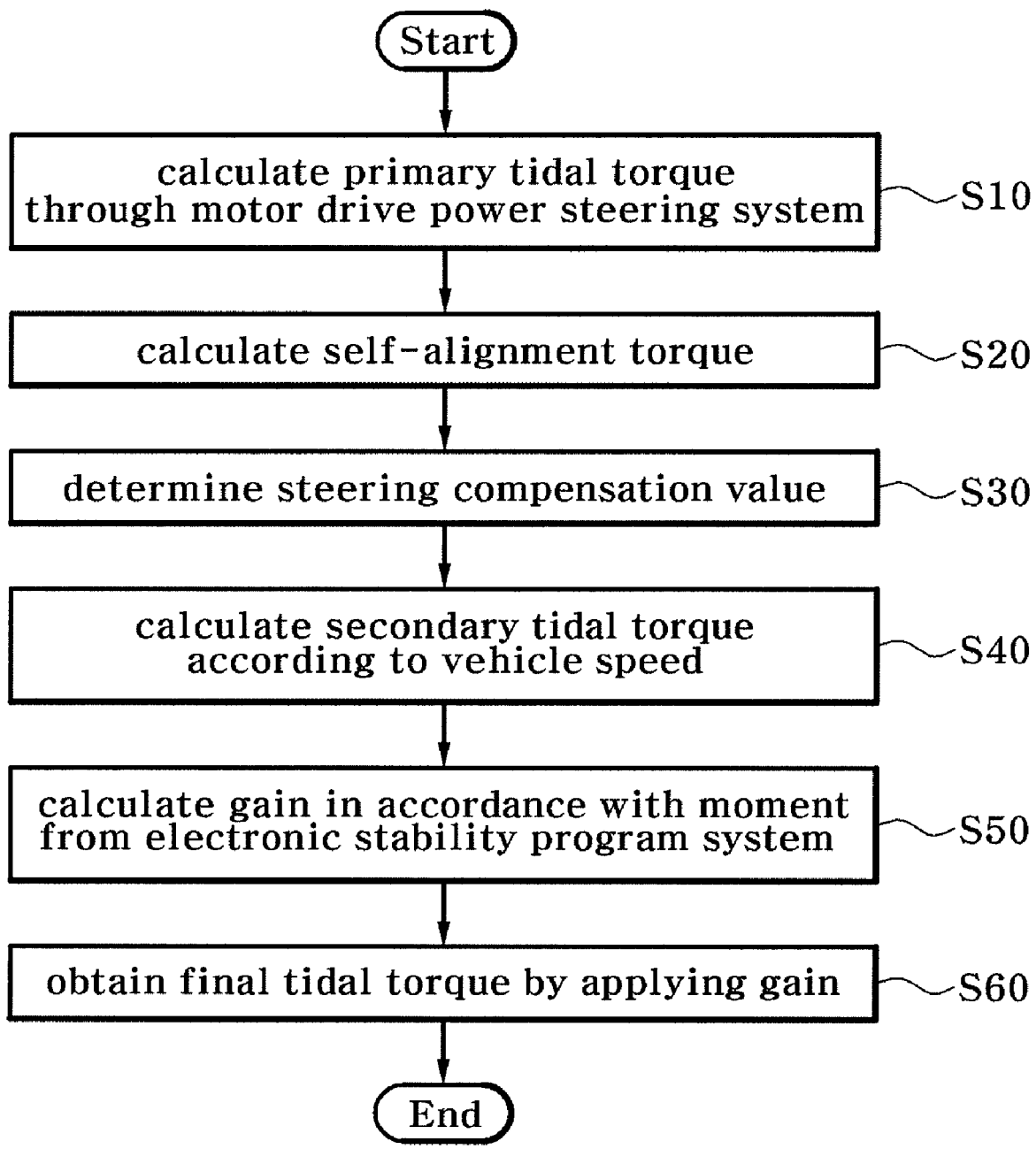
FIG. 1 is a flowchart explaining a method for compensating steering of a motor drive power steering (MDPS) system according to an embodiment of the present invention.

FIG. 1 is a flowchart explaining a method for compensating steering of an MDPS system according to an embodiment of the present invention.

In FIG. 1, the method for compensating steering of the MDPS system includes calculating primary tidal torque (or primary torque) through the MDPS system in operation S10; calculating self-alignment torque generated when steering a vehicle in operation S20; determining a steering compensation value based on the self-alignment torque and a steering angle in operation S30; calculating secondary tidal torque (or secondary torque) by applying the steering compensation value according to speeds of the vehicle to the primary torque in operation S40; and controlling an application gain of the secondary torque in accordance with moment input from an electronic stability program (ESP) system and obtaining final tidal torque (or final torque) in operations S50 and S60.

Detailed descriptions of the above method for compensating the steering of the MDPS system are as follows.

In operation S10, the MDPS system calculates the primary tidal torque based on steering torque, the steering angle, and the vehicle speed.

In operation S20, the self-alignment torque generated when steering the vehicle is calculated to determine a slip of the vehicle.

The self-alignment torque decreases when an excessive slip occurs on a low-friction road surface. At this time, a driver feels light steering torque, and the assistant torque of the MDPS system is also lowered. On the other hand, steering input becomes larger.

In other words, at the moment when the excessive slip occurs on the low-friction road surface, a driver experiences a much low self-alignment torque than usual. Thus, the steering angle of this time is compared to thereby determine whether slip has occurred or not.

If it is determined that slip has occurred, the steering torque increases so that a driver experiences heavy steering torque. Further, a torque overlay function is fulfilled to provide elasticity so that steering can be performed easily during reverse steering.

As methods for fulfilling the torque overlay function of the MDPS system, there are generally two methods.

One method is to providing steering elasticity by calculating the self-alignment torque, and the other method is to realize heavy steering based on z-axis moment of the vehicle input from the ESP system.

First, the method of providing the steering elasticity by calculating the self-alignment torque will be described below.

Here, the self-alignment torque refers to a force for restoring a steering wheel to a center position, which is caused by torsion based on friction between a road surface and a tire.

Figure 2:
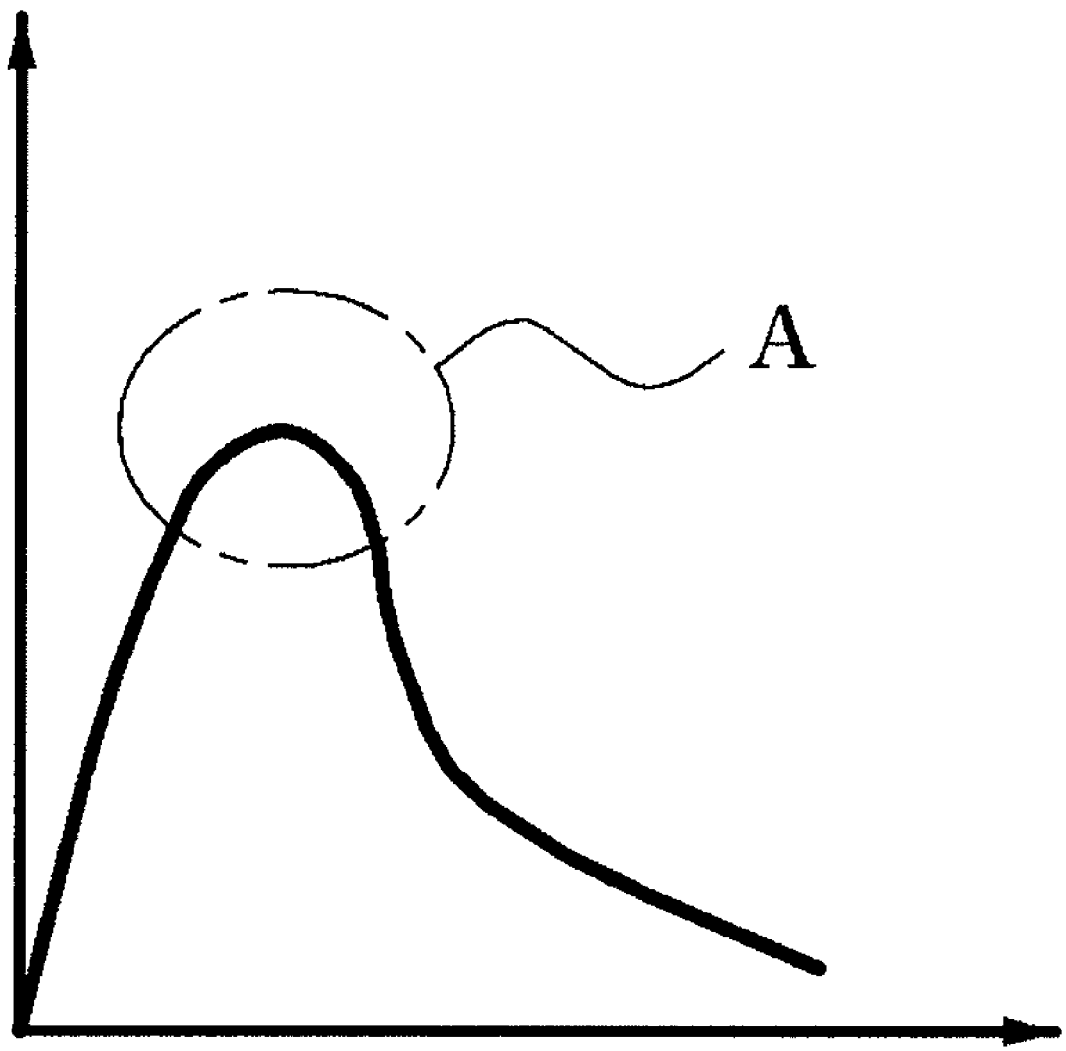
FIG. 2 is a graph depicting variation in general self-alignment torque.

FIG. 2 is a graph depicting variation in general self-alignment torque.

In FIG. 2, the self-alignment torque linearly and continuously increases before region A, is saturated near the region A, and nonlinearly decreases after the region A.

Accordingly, to estimate the self-alignment torque, driver's steering torque $T_{sensor}$, MDPS system's assistant torque $T_{assist}$, and vehicle steering system's friction $f_{system}$ are combined as in Expression 1.

$$T_{aling} = T_{sensor} + T_{assist} + f_{system} \quad \text{[Expression 1]}$$

Here, the assistant torque $T_{assist}$ of the MDPS system is calculated by an electric current flowing in a drive motor and a worm-gear ratio as in Expression 2.

$$T_{assist} = I_{motor} \times G_{worm} \quad \text{[Expression 2]}$$

Thus, the calculated self-alignment torque is used to determine the region A of FIG. 2, when excessive slippage of a tire occurs.

Figure 3:
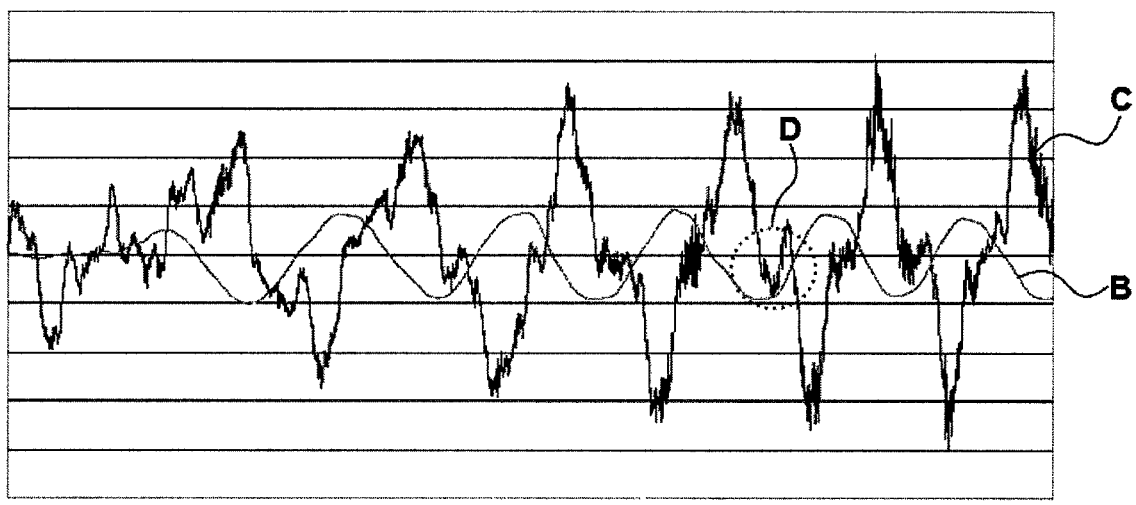
FIG. 3 is a graph depicting self-alignment torque measured according to steering angles.

FIG. 3 is a graph depicting self-alignment torque measured according to steering angles.

In FIG. 3, 'B' indicates the steering angle, and 'C' indicates the self-alignment torque.

Referring to region D in FIG. 3, the self-alignment torque becomes zero at a steering angle of −100 degrees, and maintains a small value until the steering angle becomes zero. Slip occurs within this region. In this region, torque is applied in a direction of counter-steering, i.e., in a direction counter to the steering, and thus a steering compensation value is applied, so that a driver can feel the elasticity when steering.

In operation S30, the steering compensation value is determined through mapping in consideration of the steering angle, i.e., the steering input.

Figure 4:
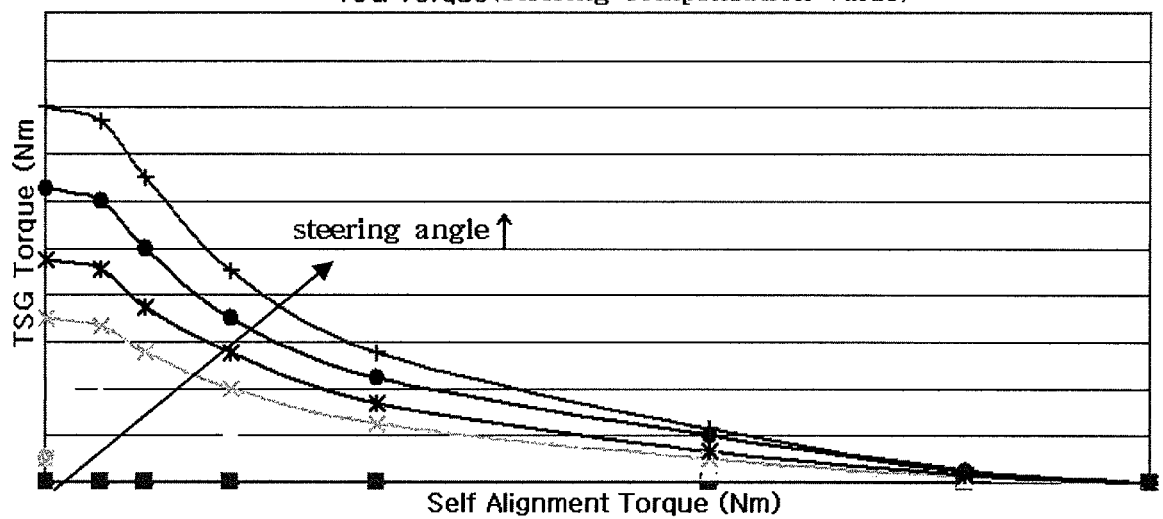
FIG. 4 is a mapping diagram showing a steering compensation value applied to the method for compensating steering of the MDPS system according to an embodiment of the present invention.

FIG. 4 is a mapping diagram showing a steering compensation value applied to the method for compensating steering of the MDPS system according to an embodiment of the invention.

In FIG. 4, a horizontal axis indicates an estimated value of the self-alignment torque, and the steering compensation value of a vertical axis is determined corresponding to input steering angles.

Under normal driving conditions, the self-alignment torque increases as the input steering angle of a driver increases. Nevertheless, if a driver continuously increases the steering angle excessively, a front wheel slips in excess. At this moment, the self-alignment torque decreases nonlinearly. Specifically, the moment when the self-alignment torque is abnormally decreased even though the input steering angle is large approximates to the origin of the horizontal axis. At this time, the steering compensation value is determined according to input steering angles of a driver.

The mapping diagram of the steering compensation value logarithmically drops from left to right, thereby eliminating the heterogeneous steering.

In operation S40, the steering compensation value is applied to the primary tidal torque according to the vehicle speed, so that the secondary tidal torque can be calculated.

Figure 5:
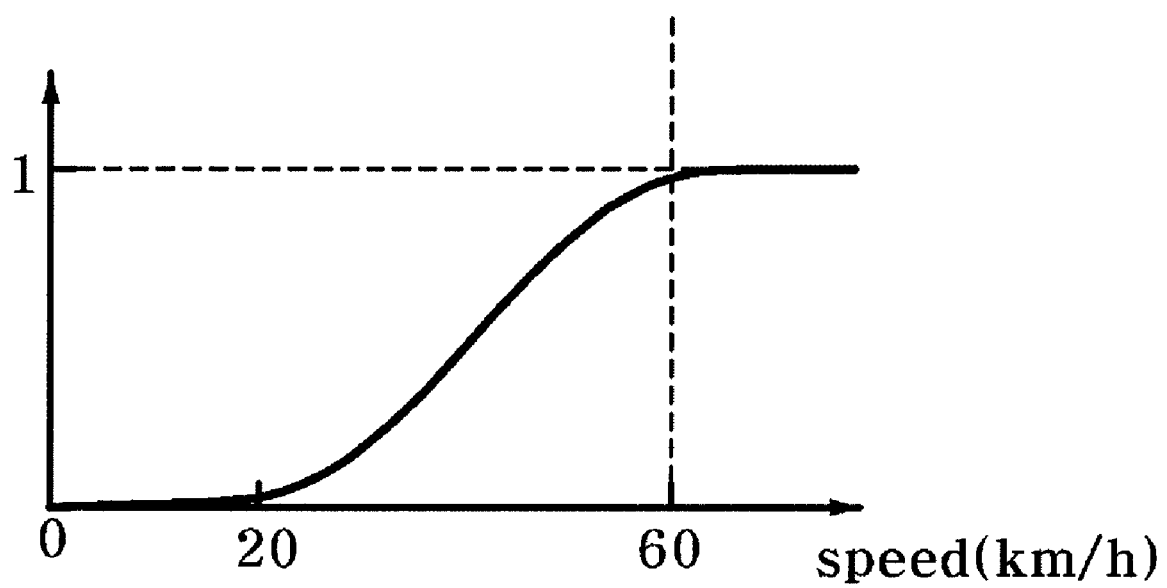
FIG. 5 is a graph depicting an application range of the steering compensation value according to a vehicle speed in the method for compensating steering of the MDPS system according to an embodiment of the present invention.

FIG. 5 is a graph depicting an application range of the steering compensation value according to a vehicle speed in the method for compensating steering of the MDPS system according to an embodiment of the present invention.

In FIG. 5, for example, if the vehicle speed is slower than or equal to 20 km/h, the steering compensation value is not applied. If the vehicle speed is faster than or equal to 60 km/h, the steering compensation value is maximally applied. If the vehicle speed is faster than 20 km/h and slower than 60 km/h, the steering compensation value is linearly applied.

That is, at a low speed, e.g., while parking the vehicle, the steering compensation value is not applied since it is not a dangerous situation and a driver can control the vehicle even though the steering compensation value is determined. On the other hand, under the normal driving condition, the determined steering compensation value is maximally applied to thereby fulfill the steering elasticity.

Next, to fulfill the torque overlay function of the MDPS system, the z-axis moment $M_z$ of the vehicle input from the ESP system is used to provide the heavy steering feel when understeer or oversteer occurs.

In operations S50 and S60, an application gain of the secondary tidal torque is controlled in accordance with the z-axis moment $M_z$ input from the ESP system and a final tidal torque is obtained.

Here, the gain is obtained by Expression 3 where 'A' is variable as a tuning parameter according to the steering heaviness to be achieved by adjustment according to user demand.

$$\text{Gain} = 1 - \left(\frac{|M_z|}{A}\right) \qquad \text{[Expression 3]}$$

The obtained gain has a value of 0 to 1. Then, the secondary tidal torque is multiplied by the gain, so that the steering heaviness can be varied according to the values of the gain when the z-axis moment $M_z$ is generated, i.e., when the ESP system operates, and thus the front wheel of the vehicle generates the moment as the vehicle spins.

For example, it is assumed that the moment of the vehicle, generated by brake pressure, is 5000 Nm. In the case that tuning parameter A is set to 5000, the gain of Expression 3 becomes zero, so that it is regarded as the most dangerous situation and the steering feel of the MDPS system is maximized to prevent a driver from oversteering. On the other hand, in the case that tuning parameter A is set to 1000 Nm, the gain becomes 0.8, so that the final tidal torque can be decreased by as much as about 80% of the secondary tidal torque and thus a driver feels a steering heaviness of about 20%.

Under the coordinate control between the MDPS system and the ESP system, the driving motor current and the steering torque of the MDPS system are used to determine whether the vehicle slips or not, and the steering feel is made heavier to prevent the excessive steering when the vehicle slips excessively. Further, countersteer is possible when oversteer or understeer is generated, thereby enhancing stability of the vehicle.

Further, oversteer or understeer is determined by the MDPS system, so that improved steering feel can be provided to a driver of a vehicle while solving the heterogeneous steering, and a desired steering feel can also be provided to the driver since degree of tuning freedom is higher than that of the conventional method in which the ESP system simply applies the torque command.

As described above, according to the embodiment of the present invention, an MDPS system determines a slip of a vehicle, calculates a steering compensation value, and controls a gain based on moment input from an ESP system under coordinate control between the MDPS system and the ESP system, so that stability of the vehicle can be enhanced by reducing heterogeneous steering and preventing oversteer.

Although the present invention has been described with reference to the embodiments and the accompanying drawings, it will be apparent to those skilled in the art that the embodiments are given by way of illustration, and that various modifications and equivalent embodiments can be made without departing from the spirit and scope of the present invention. Accordingly, the scope of the present invention should be limited only by the accompanying claims as set forth below.

What is claimed is:

1. A method for compensating steering of a motor drive power steering (MDPS) system, comprising:
   calculating, by the MDPS system, a primary torque;
   calculating, by the MDPS system, a self-alignment torque generated when steering a vehicle;
   determining, by the MDPS system, a steering compensation value based on the self-alignment torque and a steering angle;
   calculating, by the MDPS system, a secondary torque by applying the steering compensation value according to a vehicle speed to the primary torque; and
   controlling, by the MDPS system, an application gain of the secondary torque in accordance with moment input from an electronic stability program (ESP) system to obtain a final torque.

2. The method according to claim 1, wherein the self-alignment torque is calculated by adding driver's steering torque, assistant torque of the MDPS system, and friction of a vehicle steering system.

3. The method according to claim 2, wherein the assistant torque of the MDPS system is calculated from an electric current flowing in a drive motor of the MDPS system.

4. The method according to claim 1, wherein the steering compensation value is in proportion to the steering angle and in inverse proportion to the self-alignment torque, and is determined according to a mapping diagram which decreases logarithmically depending on the self-alignment torque.

5. The method according to claim 1, wherein the steering compensation value according to the vehicle speed is varied according to whether the vehicle is being parked or driven.

6. The method according to claim 5, wherein the vehicle speed is greater than or equal to 60 km/h when the vehicle is driven.

7. The method according to claim 1, wherein the moment input from the ESP system comprises a z-axis moment.

8. The method according to claim 1, wherein the application gain to obtain the final torque is calculated based upon a ratio of the moment to a tuning parameter.

* * * * *